Nov. 8, 1927.
H. J. NEWELL ET AL
1,648,500
GAUGE
Filed March 9, 1926
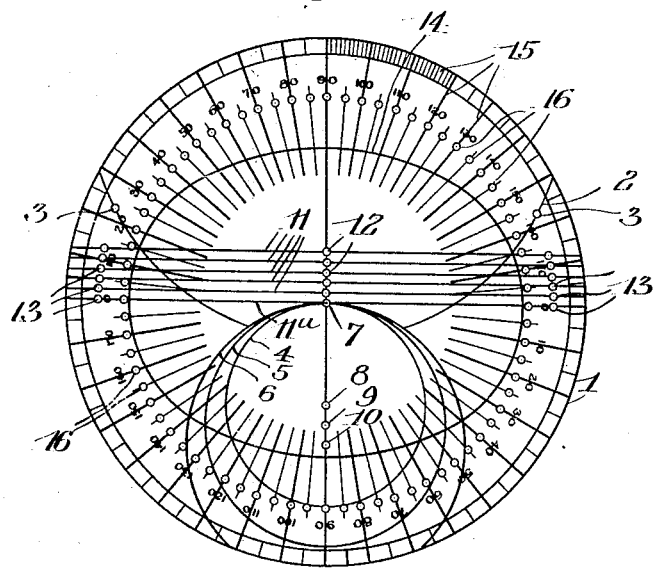
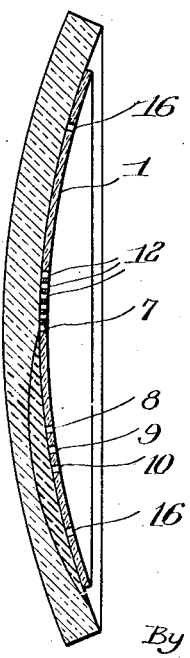
INVENTORS
Howard J. Newell
Floyd V. Fermoil
By Compton & Griffith
their ATTORNEYS

Patented Nov. 8, 1927.  1,648,500

UNITED STATES PATENT OFFICE.

HOWARD J. NEWELL AND FLOYD V. FERMOIL, OF ROCHESTER, NEW YORK, ASSIGNORS TO BAUSCH & LOMB OPTICAL COMPANY, OF ROCHESTER, NEW YORK, A CORPORATION OF NEW YORK.

GAUGE.

Application filed March 9, 1926. Serial No. 93,488.

This invention relates to gauges of a type which may be employed in laying out prescription work upon ophthalmic multifocal lenses, particularly where one side of the multifocal blank has been finished by the factory and the other side is to be finished by the jobber or retail optician in accordance with prescription specifications. Heretofore in laying out prescription work, it has been customary to place the blank or lens to be finished upon a substantially flat card or gauge having various reference marks, and then certain reference markings, which were selected for reference use in finishing the lens in accordance with the requirements of a particular prescription being filled, were placed, such as by the use of a pencil or pen, upon the upper or outer face of the lens or blank directly above corresponding markings of the card. Errors, such as are due to parallax, for example, were very apt to occur in the placing of such reference markings upon the lenses or blanks in this manner, not only because of the thickness of the lens or blank through which the readings were made, but also because of the failure of the card to fit closely the curved face of the lens or blank against which it is placed.

An object of this invention is to provide an improved gauge for this purpose with which errors in laying out prescription work will be largely eliminated or reduced with which greater accuracy and speed in the laying out of the work is possible and which will be relatively simple, convenient and inexpensive.

A further object is to provide an improved gauge set of layout sheets by which greater accuracy in prescription lay-out work may be obtained, and the lay-out work facilitated.

Various other objects and advantages will be apparent from the following description of an embodiment of the invention, and the novel features will be particularly pointed out hereinafter in connection with the appended claims.

In the accompanying drawings:—

Figure 1 is a face elevation of a gauge constructed in accordance with the invention;

Figure 2 is a transverse sectional elevation through a bifocal lens and the improved gauge in the relation to one another which they occupy in use; and Figure 3 is a side elevation of the improved gauge of Figure 1.

In the illustrated embodiment of the invention, a concavo-convex disc 1, of suitable transparent material is provided with visible markings or lines indicating the positions of various parts of multifocal lenses, and also having certain perforations or small apertures by means of which the centers of various portions of the lenses and the axes in the case of cylindrical lenses, may be marked upon the lens blank in order to enable an optician to properly locate the various portions of the different kinds of lens blanks, as required in the proper grinding of the blanks to meet various ophthalmic defects, such as in accordance with the specifications of an ophthalmic prescription. For example, the disc or gauge may have an arcuate line 2 extending across the interior of the area of the gauge or disc so as to define the margin of the distant vision section of certain multifocal lenses, and the gauge may have small apertures 3 in this line adjacent its outer ends through which deleble marks may be placed upon the lens blank in a manner to be explained hereinafter.

The gauge may also be provided with a plurality of visible arcuate lines 4, 5 and 6 of a different radii of curvature all of which intersect the arcuate line 2 and represent the margins or limits of various sized segments of the near vision area of certain types of multifocal lenses. All of the arcuate lines 4, 5 and 6 preferably pass through a common point of tangency represented by a small aperture 7, and the centers of curvature of the lines 4, 5 and 6 are represented by small apertures 8, 9 and 10 respectively. The gauge may also have a plurality of visible parallel lines 11, extending across the same and adjacent to the center of the disc or gauge, one of the lines such as 11ª being preferably tangent to all of the arcuate lines 4, 5 and 6, at the common point represented by the small aperture 7. The other lines 11 are parallel to the line 11ª and spaced apart from one another a suitable distance, preferably one mm. apart.

The apertures 7, 8, 9 and 10 are all on a straight line passing through the center of the disc or gauge, and where this common line or diameter of the gauge intersects the lines 11 and 11ᵃ, the disc is provided with small apertures 12 through which suitable markings may be made upon the lens blank for a purpose which will appear hereinafter.

The gauge may also be provided with a plurality of apertures 13 in the lines 11 and 11ᵃ, at some distance from the apertures 12 for a purpose which also will be explained shortly.

The gauge may also carry the usual elliptical line 14 intersecting the arcuate lines 2, 4, 5 and 6 in such a manner that the sections of the lines 4, 5 and 6 which are included within the area of the ellipse will represent the near vision segments of elliptical bifocal lenses.

The disc or gauge may also be provided with suitable protractor markings 15 radiating towards the center of the disc which in this example has been chosen as the aperture 7. The gauge may also have apertures 16 arranged in a circular row in various of the radii protractor markings 15, so that through these apertures 16 desired axes for cylindrical lenses may be marked upon one face of a lens blank as a guide in the finishing of the other face of the lens blank for filling a prescription requiring a particular position for the axes of a cylindrical surface of the blank.

The improved gauge or disc is dished or curved to approximately the curvature of the average lens blank, and is preferably made of transparent material which is also flexible, such as celluloid, so that it may be flexed against the entire surface of a lens blank whose surface curvature may not be exactly identical with the normal surface curvature of the gauge or disc. If desired, the gauges may be furnished in sets having surface curvatures corresponding to base curves of lenses commonly used, so that a gauge may be selected which will require little flexing to fit closely to any lens blank.

In the use of such a gauge or disc, it may be placed flat against a finished face of a lens blank as shown in Figure 2 and held there in any suitable manner, such as by the workman's fingers, during the laying out operation. When the gauge is used for certain trifocal lens blanks, for example, which have one face ground to define near, intermediate and distant vision areas, the disc will be placed against the ground face and shifted until the arcuate line 2 lies along the margin of the distance vision segment or area and the margin of the near vision segment lies along one of the lines 4, 5 and 6 or closely coincident with one of them, and by observing which one of the lines 4, 5, and 6 is nearest coincident with the segment margin, one may mark through one of the apertures 8, 9 and 10 upon the lens blank, the center of curvature of that near vision segment. For example, if the margin of the near vision segment corresponds with the line 5, the workman will know that the aperture 9, which is the center of curvature of that arcuate line 5, will be the center of the segment which he desires to locate, and a suitable marking may be made through the aperture 9 to locate such point upon the surface of the lens blank.

Such marking, of course, will be deleble and may be made in any suitable manner. For example, a pointed end of an instrument may be dipped in a paint or suitable ink and inserted through one of the apertures, such as 9, into contact with the lens surface, and some of the paint carried upon the tip of the instrument will adhere to the surface of the lens blank and provide a deleble indication. The same manner of marking may be employed for marking through all of the other apertures as desired.

The various mechanical or optical centers of the distant vision section may be located upon the lens blank by marking through one of the apertures 12 or aperture 7, as may be necessary in order to comply with the requirements of the prescription being filled and depending upon the distance desired for the major axis of the lens from the near vision segment. For example, if the major axis of the lens is to be 3 mm. above the near vision segment, one should count up three lines above the aperture 7 and provide a marking through an aperture 12 in that line which is just above the aperture 7. One could also provide deleble markings upon the lens through the apertures 13 located in the same line. This would lay out the major axis when no shifting of the axes for correction of astigmatism is desired.

In cases where the major and minor axes of a cylindrical surface are to be placed at definite angles from normal position when the outer faces of the blank are being ground, the disc or protractor is held in the same position and suitable markings made through the protractor apertures 16, as required by the prescription for the location of the desired axes. However, in case the center selected is not at the aperture 7 where the protractor lines intersect, it will be necessary to shift the protractor until the aperture 7 is over the center just marked, as explained, through one of the apertures 12, and until the line 11ᵃ is then coincident with the former line 11 which passes through the aperture 12 which was marked upon the surface. The axes may then be laid off at any angles in the manner explained.

In the use of the gauge or protractor for an ordinary bifocal blank, the disc or gauge is placed upon the finished surface until the margin of the near vision segment which has been ground coincides as closely as possible with one of the arcuate lines 4, 5, and 6, and then the various centers and reference points for the filling of the prescription may be laid out in the manner described above, as in the case of a trifocal lens. The gauge is also useful in laying out the mechanical centers of wafer segments.

It will be obvious that with such a gauge one may lay out prescription work more accurately than has been possible heretofore, and without any possibility of errors due to parallax. The insertion of a marking instrument through the small apertures will definitely locate the centers and reference points, regardless of the skill of the workman, and such lay out may be more rapidly effected and with greater accuracy than has heretofore been possible by the old flat gauge which did not conform to the curvature of the lens blank with which it was being used. Such a gauge is also relatively simple and inexpensive.

It will be obvious that various changes in the details, which have been herein described and illustrated in order to explain the nature of the invention, may be made by those skilled in the art within the principle and scope of the invention as expressed in the appended claims.

We claim as our invention:

1. A gauge for laying out prescription work on ophthalmic bifocal lenses, comprising a sheet of transparent material having thereon visible lines indicating the positions of various parts of bifocal lenses, and also having a plurality of perforations arranged to correspond to characteristics of the lens portions defined by said lines, whereby after the disc is placed face to face against a bifocal lens or blank, the lens and disc may be shifted relatively to one another until the said lines occupy desired positions upon the lens or blank, and deleble reference marks may be placed upon the lens or blank through said perforations for reference in finishing the lens or blank in accordance with a prescription.

2. A gauge for laying out prescription work on ophthalmic bifocal lenses of the type having an upper distance vision segment, and a lower distance vision segment intersecting the upper segment, said gauge comprising a sheet of transparent material carrying visible lines corresponding to the limits of said segments for some distance above and below their intersection, said sheet having small marking apertures therein corresponding to characteristics of the segment, whereby when the gauge is placed face to face against a bifocal lens or blank, one may shift the gauge over the lens or blank until its lines assume the desired relation to the lines, and deleble marks placed upon the lens or blank through said apertures for reference in finishing the lens or blank in accordance with the specifications of a prescription.

3. A gauge for laying out prescription work on ophthalmic bifocal lenses, comprising a sheet of transparent flexible material having thereon visible lines indicating the positions of various parts of bifocal lenses, and also having a plurality of perforations arranged to correspond to characteristics of the lens portions defined by said lines, whereby after the disc is placed face to face against a bifocal lens or blank, the lens and disc may be shifted relatively to one another until the said lines occupy desired positions upon the lens or blank, and deleble reference marks may be placed upon the lens or blank through said perforations for reference in finishing the lens or blank in accordance with a prescription.

4. A gauge for laying out prescription work on ophthalmic bifocal lenses of the type having an upper distance vision segment, and a lower distance vision segment intersecting the upper segment, said gauge comprising a sheet of transparent flexible material carrying visible lines corresponding to the limits of said segments for some distance above and below their intersection, said sheet having small marking apertures therein corresponding to characteristics of the segment, whereby when the gauge is placed face to face against a bifocal lens or blank, one may shift the gauge over the lens or blank until its lines assume the desired relation to the lines, and deleble marks placed upon the lens or blank through said apertures for reference in finishing the lens or blank in accordance with the specifications of a prescription.

5. A gauge for laying out prescription work on ophthalmic bifocal lenses, comprising a concavo-convex sheet of transparent material having thereon visible lines indicating the positions of various parts of bifocal lenses, and also having a plurality of perforations arranged to correspond to characteristics of the lens portions defined by said lines, whereby after the disc is placed face to face against a bifocal lens or blank, the lens and disc may be shifted relatively to one another until the said lines occupy desired positions upon the lens or blank, and deleble reference marks may be placed upon the lens or blank through said perforations for reference in finishing the lens or blank in accordance with a prescription.

6. A gauge for laying out prescription work on ophthalmic bifocal lenses of the type having an upper distance vision segment, and a lower distance vision segment intersecting the upper segment, said gauge comprising a concavo-convex sheet of transparent material carrying visible lines corresponding to the limits of said segments for some distance above and below their intersection, said sheet having small marking apertures therein corresponding to characteristics of the segment, whereby when the gauge is placed face to face against a bifocal lens or blank, one may shift the gauge over the lens or blank until its lines assume the desired relation to the lines, and deleble marks placed upon the lens or blank through said apertures for reference in finishing the lens or blank in accordance with the specifications of a prescription.

7. A gauge for laying out prescription work on ophthalmic bifocal lenses of either the blank or semi-finished type having an upper distance vision segment and a lower near vision segment said gauge comprising a sheet of transparent material carrying visible reference markings, including curves corresponding to curves of near vision segments of different diameters, and also other visible markings by which various desired mechanical centers of the lens segments may be indicated when the sheet is placed flat against a lens or blank surface, said sheet having apertures therein through which deleble reference marks may be placed upon a surface of the lens or blank, indicating for use in finishing the lens or blank in accordance with prescription specifications.

8. A gauge for laying out prescription work on ophthalmic bifocal lenses of either the blank or semi-finished type having an upper distance vision segment and a lower near vision segment said gauge comprising a sheet of transparent material carrying visible reference markings, including curves corresponding to curves of near vision segments of different diameters, and also other visible markings by which various desired mechanical centers and axes of the lens segments may be indicated when the sheet is placed flat against a lens or blank surface, said sheet having apertures therein through which deleble reference marks may be placed upon a surface of the lens or blank, indicating for use in finishing the lens or blank in accordance with prescription specifications.

9. A gauge for laying out prescription work on ophthalmic bifocal lenses of either the blank or semi-finished type having an upper distance vision segment and a lower near vision segment said gauge comprising a dished sheet of transparent material carrying visible reference markings, including curves corresponding to curves of near vision segments of different diameters, and also other visible markings by which various desired mechanical centers of the lens segments may be indicated when the sheet is placed flat against a lens or blank surface, said sheet having apertures therein through which deleble reference marks may be placed upon a surface of the lens or blank, indicating for use in finishing the lens or blank in accordance with prescription specifications.

10. A gauge for laying out prescription work on ophthalmic bifocal lenses of either the blank or semi-finished type having an upper distance vision segment and a lower near vision segment, said gauge comprising a sheet of transparent flexible material carrying visible reference markings, including curves corresponding to curves of near vision segments of different diameters, and also other visible markings by which various desired mechanical centers of the lens segments may be indicated when the sheet is placed flat against a lens or blank surface, said sheet having apertures therein through which deleble reference marks may be placed upon a surface of the lens or blank, indicating for use in finishing the lens or blank in accordance with prescription specifications.

11. A gauge for laying out prescription work on ophthalmic bifocal lenses of either the blank or semi-finished type having an upper distance vision segment and a lower near vision segment, said gauge comprising a dished sheet of transparent flexible material carrying visible reference markings, including curves corresponding to curves of near vision segments of different diameters, and also other visible markings by which various desired mechanical centers of the lens segments may be indicated when the sheet is placed flat against a lens or blank surface, said sheet having apertures therein through which deleble reference marks may be placed upon a surface of the lens blank, indicating for use in finishing the lens or blank in accordance with prescription specifications.

12. A gauge for laying our prescription work on ophthalmic bifocal lenses of either the blank or semi-finished type having an upper distance vision segment and a lower near vision segment, said gauge comprising a sheet of transparent material dished to a desired base curvature carrying visible reference markings, including curves corresponding to curves of near vision segments of different diameters, and also other visible markings by which various desired mechanical centers of the lens segments may be indicated when the sheet is placed flat against a lens or blank surface, said sheet having apertures therein through which deleble reference marks may be placed upon a surface of the lens or blank, indicating for use in finishing the lens or blank in accordance with prescription specifications.

HOWARD J. NEWELL.
FLOYD V. FERMOIL.